United States Patent [19]

Reiger et al.

[11] Patent Number: 4,574,522

[45] Date of Patent: Mar. 11, 1986

[54] ROOT CONTROL BAG

[76] Inventors: Ralph E. Reiger, 4131 N. Portland, Oklahoma City, Okla. 73112; Carl E. Whitcomb, Rte. 3, Box 251 F, Stillwater, Okla. 74074

[21] Appl. No.: 486,984

[22] Filed: Apr. 20, 1983

[51] Int. Cl.[4] ........................ A01G 9/02; A01G 23/04

[52] U.S. Cl. ........................................... 47/78; 47/76

[58] Field of Search ..................... 47/73, 78, 58, 9, 74, 47/76, 77

[56] References Cited

U.S. PATENT DOCUMENTS

| | | | |
|---|---|---|---|
| 1,464,534 | 8/1923 | Lovett, Jr. | 47/73 |
| 1,894,506 | 1/1933 | Wilson | 47/73 |
| 2,017,308 | 10/1935 | Elmer | 47/77 |
| 2,749,964 | 6/1956 | Manning | 47/9 |
| 2,758,419 | 8/1956 | Schmitz | 47/73 |
| 2,902,795 | 9/1959 | Heigl et al. | 47/58 |
| 3,094,810 | 6/1963 | Kalpin | 47/73 |
| 3,678,620 | 7/1972 | Joges | 47/73 |
| 3,691,004 | 9/1972 | Werner et al. | 47/9 |
| 4,042,655 | 8/1977 | Platt et al. | 264/25 |
| 4,098,021 | 7/1978 | Gruber | 47/58 |
| 4,154,889 | 5/1979 | Platt | 428/234 |
| 4,199,644 | 4/1980 | Platt | 428/300 |

FOREIGN PATENT DOCUMENTS

| | | | |
|---|---|---|---|
| 2744143 | 4/1979 | Fed. Rep. of Germany | 47/78 |
| 1597853 | 8/1970 | France | 47/78 |
| 48-35081 | 10/1973 | Japan | 47/73 |

*Primary Examiner*—Robert A. Hafer
*Assistant Examiner*—Daniel Nolan
*Attorney, Agent, or Firm*—C. Clark Dougherty, Jr.

[57] ABSTRACT

A process for growing nursery stock (e.g. trees, shrubs, etc.) involving the specific improvement of confining root propagation to a nonwoven porous polymeric fabric bag such that growth through the bag is severely constricted at the fabric, producing a girdling effect and root branching within the bag. Such a process leads to a tightly packed, highly root branched soil ball even in loose sandy loam that is easily removed from the field, readily transported and effective in re-establishing the tree upon transplanting even during the hot summer months.

17 Claims, 4 Drawing Figures

ROOT CONTROL BAG

BACKGROUND OF THE INVENTION

1. Field of the Invention:

This invention relates to a method of controlling plant root growth. More specifically, the invention relates to a method of growing plants in the field wherein the root growth is controlled by the presence of a porous plastic bag.

2. Description of the Prior Art:

The basic concept of growing nursery stock, such as trees and the like, in containers is a well known commercial activity. However, the growing of trees in a container is efficient and economical only during the early period of the plant's development and is pragmatically restricted to containers no larger than about five gallons in size. Goodale, Toby W. and Whitcomb, Carl E. in a pair of articles entitled "Producing Woody Ornamental Shrubs in Containers, Costs of Production and Projected Profits", Ornamentals South, Vol. 2 (4); pages 20 through 25 (1980) and "Producing Woody Ornamental Shrubs in Containers, Influence of Fertility Level and Container Size", Ibid. Vol. 2 (3); pages 10 through 13 (1980), found that for most plants there is an optimum container size for growth of the particular plant with maximum economic return. Generally, it was found that to grow trees in containers more than two years was not economically feasible.

Contemporary improvements in the fundamental understanding of the nutrition of tree seedlings (and plants in general; for example, see U.S. Pat. No. 4,328,025) both in the propagation container and subsequent larger container have led to improved growth rates. Furthermore, recent developments in various aspects of air-root pruning of the tree seedling to destroy the tap root and stimulate a much more fibrous root system (such as described in co-pending U.S. application Ser. No. 309,085) further complicates the commercial economics of growing trees in containers in that the tree outgrows the container before the commercial distribution and sales take place. Thus, the also well known basic concept of growing plants such as trees and the like in containers until the young plants are mature enough to be transplanted to a field in a relatively compact or dense planting arrangement wherein their development continues until sold appears to be pragmatically a necessary commercial practice. This conclusion is further supported when considering the additional problems associated with the alternative of continuing the tree growth in a container. Namely, high summer temperatures reduce top and root growth principally due to the abnormally high soil temperatures in the container, while low winter temperatures may damage or kill roots even though the tops would have normally survived the winter if planted in the field and the vertical growth of trees frequently results in containers being blown over which means they must be straightened before watering and the like.

In contrast to the above problems, an article by Hogan, Charles and Whitcomb entitled "Producing Container Nursery Stock in the Field" Research Report P-705 of the Oklahoma Agricultural Experimental Station, Pages 43–44 (1974) observed that if plants could be produced in containers buried in the field, the surrounding soil would insulate the container from high summer temperatures and low winter temperatures, while holding plants upright at all times without staking. However, in order for such a system to function, a procedure must be developed to confine the roots to the growing medium in the container. Otherwise, the roots would grow out of the container into a large mass of soil, thus requiring digging and cutting before marketing. One of the major advantages to container grown stock is that most of the roots go with the top of the plant at marketing, thus no shock or adjustment occurs. It was felt that nearly one hundred percent retention of roots must be maintained if the field production with container system is to be considered.

SUMMARY OF THE INVENTION

In view of the prior art, we have discovered an in the field method of controlling the root growth of nursery stock intended for transplanting comprising the steps of:

(a) excavating a hole in the earth;

(b) inserting within the hole a nonwoven, porous, polymeric fabric;

(c) filling the fabric with growing media; and (d) planting and growing a plant within the fabric in the earth such that the fabric (i.e., root enclosure bag) and the growing plant can later be removed from the earth as a single unit for transporting and transplanting. Thus, according to one embodiment of the present invention, a nursery stock plant is placed (transplanted in the field) into a growing media confined by a nonwoven porous polymeric fabric bag. Preferably, the nonwoven porous polymeric fabric is a nonwoven, bonded polymeric fiber fabric formed of staple polymeric thermoplastic fibers such as the products produced and sold by Phillips Fibers Corporation, a subsidiary of the Phillips Petroleum Company under the trade names Petromat and Supac Filter Fabric.

For further explanation of the nature of the nonwoven, porous, polymeric fabric marketed by Phillips Fibers Corporation employed in the containers according to the present invention, see U.S. Pat. No. 4,042,655; 4,154,889 and 4,199,644, assigned to Phillips Petroleum Company, wherein methods and equipment for the production of needle bonded, drafted, fused, batts or webs of nonwoven synthetic fabric from polymers such as polyolefin, polyester and polyamide are disclosed. Typically, the fabric is manufactured from synthetic staple fibers preferably made into batts with fibers oriented in the fill direction. The batt is then subjected to drafting (stretching) in the warp and/or fill directions with needling (needle bonding) and fiber fusion (infrared radiation, heated roller or hot fluid). Fabrics characterized by various batt weights from 1 to about 20 ounces per square yard using preferably staple lengths of about one and a half to ten inches of from about one to twenty denier, at needled densities of from about one hundred to one thousand punches per square inch and draft ratios of about 1.01 to 4 are described, all of which, for purposes of this invention and claims herein, are collectively referred to as "nonwoven, porous, polymeric fabric".

In other words, the present invention provides in a method for the growing of nursery stock intended for transplanting wherein the roots of the plant are confined to a container partially filled with growing media, the specific improvement comprising; making the container from a non-woven porous polymeric fabric wherein the fabric is operatively capable of pruning said roots and inducing root branching when said roots penetrate said fabric.

It is an object of the present invention to provide a barrier or container to be used either below or above grade that partially confines plant root propagation, restricts lateral root extension, controls root swirl and partially root prunes at the surface of the containers; thus stimulating and accelerating root branching within the container. It is an ancillary object that this barrier be a fabric that can be made into a bag or other root restrictive liner such that the container confines more of the roots to the interior of the bag and simultaneously functions in a manner analogous to the traditional ball and burlap technique of transplanting trees or the like. The fulfillment of these objects and the presence and fulfillment of additional objects will be apparent upon complete reading of the specification and claims taken in conjunction with the attached drawings.

DESCRIPTION OF THE PREFERRED EMBODIMENTS

Figures 1, 2:
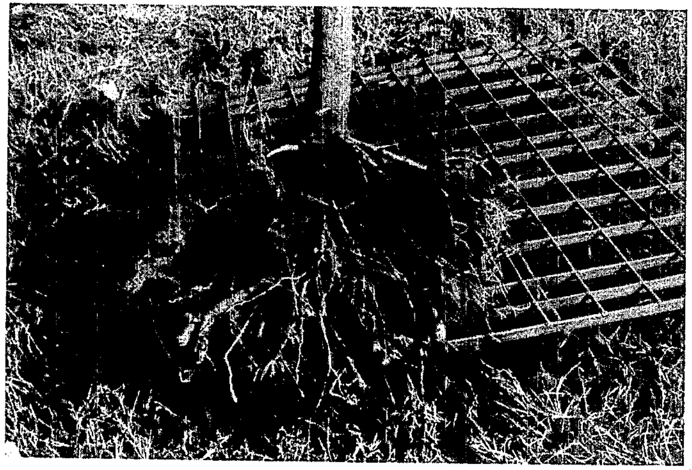
FIG. 1 is a photograph of a root ball on a river birch in a root control bag according to the present invention.
FIG. 2 is a photograph of the root structure on a green ash after growth in the root control bag according to the present invention.

The method according to the present invention, in the broadest sense, involves the use of a porous plastic bag, whether above grade or below, to confine plant root propagation to essentially the interior of the bag. Preferably, the bag is made from a synthetic, decay resistant, nonwoven, porous, polymeric fabric having sufficient structural strength that it will serve as the equivalent to the burlap wrapping during subsequent transplanting of the plant to its final location. Thus, the method according to the present invention is envisioned as being effective during intermediate stages of the development, handling, shipping and storage of the plant.

Preferably, the bag or more specifically, the fabric employed to make the bag, should have sufficient structural integrity and/or be sufficiently impervious to root penetration such that the root growth will only partially penetrate the fabric. Because of the partial penetration of the bag, the root growth at the surface of the fabric will be severely constricted, thus promoting root branching as well as accumulation of carbohydrates within the bag which in turn supports rapid root growth following removal of the bag. One particular type of fabric meeting the foregoing requirements is a nonwoven porous, polymeric staple fiber fabric manufactured by Phillips Fibers Corporation and sold under trade names Petromat or Supac Filter Fabric. However, other nonwoven, porous, bonded polymeric fabrics, plastics and other liner materials are envisioned as being equivalent for purposes of this invention, provided the requisite porosity and structural strength as well as resistance to degradation when buried in the earth and ultra-violet stability when used above grade are achieved. Thus, many of the vinyl compositions or vinyl coated fabrics are to be considered equivalent for purposes of this invention.

As mentioned above, the preferred fabric for use in accordance with the present invention is a nonwoven, porous, polymeric fabric of the type described in U.S. Pat. Nos. 4,154,889; 4,042,655; and 4,199,644. Patent 4,154,889 issued May 15, 1979, describes the basic method of forming a nonwoven, needled fabric from staple synthetic thermoplastic fibers selected from the group of polyolefin, e.g., polypropylene, polyester and polyamide fibers. The method involves, among other things, forming a needled bat of the fibers and optionally heat fusing the fibers in the bat using heated rolls. Patent 4,042,655 issued Aug. 16, 1977, describes improvements in the forming method and fabric including, among other things, fusing at least a portion of the fibers by infrared radiation. Patent 4,199,644 issued Apr. 22, 1980, describes additional improvements in the forming method and fabric, particularly in needling the fabric. The most preferred fabric for use in accordance with this invention is a nonwoven, porous, bonded polymeric fiber fabric of the type marketed under the trade names PETROMAT and SUPAC FILTER FABRIC by Phillips Fibers Corporation. Such fabrics are formed in accordance with the teachings of one or more of the above-mentioned patents, and specifically are nonwoven, porous, needled, fused fabrics formed of staple synthetic thermoplastic fibers.

One particular attribute of such nonwoven, porous, bonded staple polymeric fiber fabric that makes it particularly useful in the present invention is the observed tendency for roots to go through the fabric, but further development of the root is restricted. This cessation of root growth is caused by severe restriction, or more specifically, circumferential constriction applied by the fabric to the root as a result of the stable fibers of the fabric being bonded together by needling (sewing together) and/or by fusion. Consequently, the root after penetrating the fabric is unable to increase in diameter within the fabric leading to a girdling effect at the bag. Literally, a nodule or enlargement of the root will occur on either side of the fabric barrier with a fine root thread through the fabric connecting the two sides. This restriction at the fabric severely retards root growth outside the bag and so represents a naturally weak structural point for root breakage when removing the bag during subsequent transplanting. However, a more important feature of this type of root growth, or perhaps, more accurately the lack of root growth (i.e., physical root pruning) is the tendency for it to induce root branching on the inside of the bag in a manner analogous to what occurs when air-root pruning, or, in fact, other plant pruning takes place. Because of the root pruning effect of the fabric bag and the associated secondary branching behind the root tip, a very fibrous compact root system will develop within the confines of the bag. Furthermore, the restriction at the fabric promotes the root storage of carbohydrates within the bag. These features of the present invention are felt to be novel and extremely useful, leading to a series of unexpected results and advantages (e.g.; the observation of twenty inches of additional root growth within seven weeks of transplanting a river birch and a count of over 5,000 root branches on a green ash, as exemplified later).

Since the root branching is induced within the confines of the bag and the plant with the bag is removed as a single unit for purposes of transplanting, the number of root ends available as well as the relative percentage of the total root structure available for re-establishing the plant after transplanting is maximized. Consequently, the odds of survival after transplanting even under adverse conditions is enhanced. Also, the resistance to or the ability to survive transplantation during hot summer months is also enhanced. For all practical purposes, trees grown according to the method of the present invention can be transplanted successfully throughout the hot summer months, even in the southern states (as exemplified later). Thus, the method according to the present invention extends the season for transplanting well beyond that which is ordinarily employed in the industry.

The very fibrous root ball structure within the bag also allows the use of sandy loam soils or other relatively loose growing media which were not particularly compatible with the prior art ball and burlap technique. Also, the inherent girdling effect along with cessation of external root propagation tends to allow for easy removal of the plant, root ball and fabric bag as a single unit, making the overall transplanting operation extremely easy and highly successful. Thus, the present invention preserves essentially all of the advantages associated with planting in the field (i.e., root protection from temperature extremes and prevention of trees and the like from being blown over), yet supplements these advantages with several highly desirable additional features.

The use of the nonwoven, porous, polymeric fabric bag liner according to the present invention is straightforward. If the plant is to be grown below grade, an appropriate hole is excavated or dug in the field and the bag is inserted as a liner, otherwise, the bag can be placed at an appropriate location above grade. Optionally, a plastic film barrier can be placed in the bottom of the hole (or on the ground for above grade use) before inserting the bag liner. Any appropriate growing media can then be placed within the bag. The plant is then placed in the growing media and allowed to grow. In principle, the plant can be at essentially any early stage of development, including planting the seed or seedling directly in the field. For all practical purposes, it is envisioned that the preferred commercial utilization of the invention will involve the transplanting of one to five gallon container grown nursery stock into the buried liner bag (or tightly packed above grade bags) when the plants can no longer be optimally sustained in the container. Because of the possibility of close spacing and the presence of the fabric bag with associated root growth confinement, proper water management during this stage of plant development is critical.

The bag liner itself can be manufactured in essentially any appropriate size or shape. Preferably, it will be sewn or glued along seams producing a root confining structure that will serve as the soil releasing unit during final transplanting of the plant. This bag is physically removed from the root ball as the last step before replanting.

The following example is presented to illustrate one preferred embodiment of the overall process according to the present invention.

EXAMPLE

Using a 6 ounce Supac Filter Fabric manufactured by Phillips Fibers Corporation, a subsidiary of Phillips Petroleum Company, a series of bags were sewn together. Each bag was approximately 20 to 24 inches in diameter and about 12 to 14 inches deep. Holes 24 inches in diameter were prepared by an auger in a sandy loam soil. A single disc of 6 mil polyethylene film of 24 inch diameter was placed at the bottom of each hole. The bags were then placed in the hole and filled with loose soil removed by the auger. Tree seedlings that had been air-root pruned in bottomless containers for about three months and then grown in two gallon poly bags for the remainder of the growing season were transplanted in December into the bags.

The soil of the entire field had been fertilized previously to provide about 75 pounds per acre of $P_2O_5$ and 300 pounds per acre of $K_2O$. Nitrogen was broadcast over the entire field at about 200 pounds per acre using urea.

During the following months, the trees were drip irrigated to stimulate growth and prevent moisture stress. Weed control was accomplished with Ronstar pre-emergent herbicide at about 2 pounds active ingredient per acre along with spot spraying with Roundup contact herbicide as needed.

After twenty-one months in the field, loblolly pine had reached 8 feet tall with 2½ inch stem calliper and river birch were 10 feet tall with 2½ inch calliper. In late August of the third growing season, three trees of each species were dug by inserting a sharp square pointed flat blade shovel around the fabric bag to the depth of the polyethylene sheet and the trees were lifted from the soil by hand. The trees with bagged root balls intact were transported approximately 38 miles and then replanted into a sandy loam soil after removal of the bag. The temperature was in excess of 100° F. on the days the trees were dug and replanted, yet no wilting or subsequent leaf drop occurred. All trees survived.

The effect of fabric bag on root development was apparent upon examining the roots of the trees. As the roots grew outward and downward, they penetrated the fabric bag generally whenever contact with the fabric was made. However, the nature of the penetration was highly restricted in that the roots that penetrated the bag grew in diameter on the inside of the bag, diminished to a very small diameter as passed through the fabric, enlarged somewhat on the outside of the bag and then quickly decreased in diameter; thus, the fabric constricted the roots causing a severe girdling effect. As seen in FIG. 1, a river birch tree still in the root control bag typically exhibited only relatively small diameter roots external to the bag. In contrast, FIG. 2 illustrates a green ash tree removed from the root control bag with the surrounding dirt removed. As illustrated, the roots of the green ash tree tended to break at the girdle corresponding to passing through the bag, thus exposing a highly branched, fibrous root structure which had developed within the bag. This is considered novel and unexpected in that the green ash tree is known to be difficult to transplant because of the lack of a fibrous root structure. In attempting to quantitatively define and measure the fibrous root structure observed in the green ash tree, a selected surface count of root branches extrapolated to the size of the root ball resulted in an estimated 5,037 total roots being present. Prior to the present invention, 150 roots would be an extraordinary value for a green ash.

Figure 3:
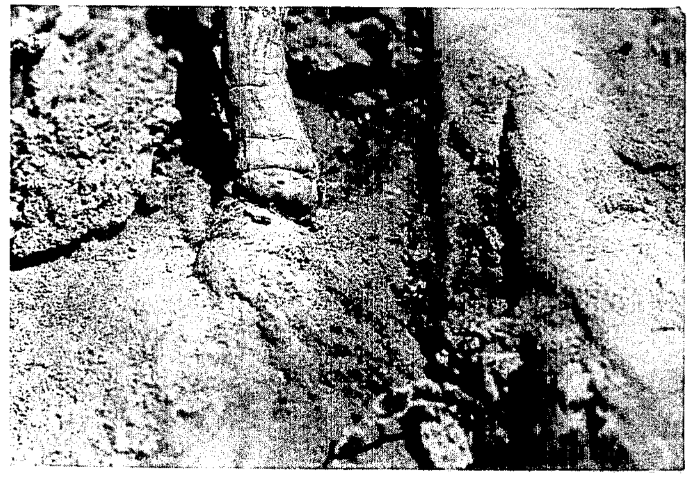
FIG. 3 is a photograph of the circumferential constricted root growth that occurs as the root penetrates the fabric bag according to the present invention.

As seen in FIG. 3, the typical root of the loblolly pine as it approached the fabric bag from the inside of the bag was about one-half inch diameter, but reduced to less than one-eighth inch diameter on the outside of the bag and tended to sever at the girdle when the bag was removed, thus exposing a blunt root nodule. This restriction in lateral root development also stimulated secondary branching behind the root tip nodule within the bag similar to the branching accomplished by air-root pruning. The enlarged root nodule is felt to represent a natural carbohydrate reservoir or storage which enhances subsequent root growth and re-establishment of the plant after transplanting. The increased branching tends to hold the soil ball together in a very solid mass as opposed to the normal ball and burlap method, thus also improving the transplantability. Likewise, following removal of the bag and replanting, many mre root tips exist to grow into the surrounding soil and anchor and establish the tree.

Figure 4:
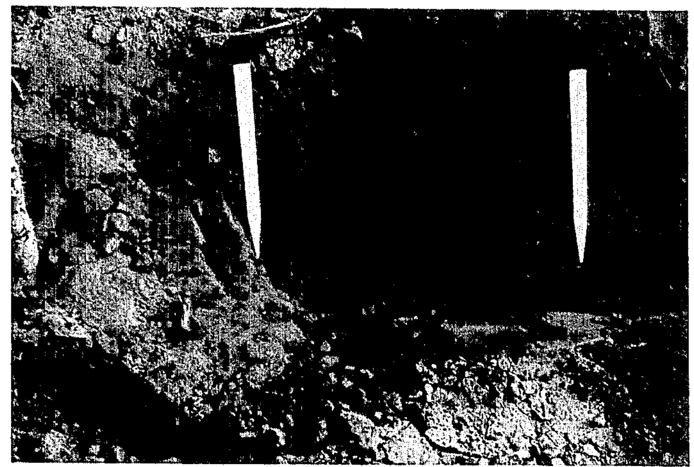
FIG. 4 is a photograph showing twenty inches of root growth of a river birch that occured within seven weeks after being transplanted from a root control bag according to the present invention.

FIG. 4 illustrates the rapid re-establishment of the roots of a river birch tree grown in a root control bag and transplanted after removal of the bag. As illustrated, a twenty inch segment of new root growth approximately the thickness of a pencil can be seen between the white pointers. This root growth took place in seven weeks and roots were found as far as three feet from the outer perimeter of the root ball.

Although the method according to the present invention involves the expenditure of additional capital and labor at a relatively early stage of the growth of the tree, the overall advantages of the system are felt to more than compensate for the costs involved. First and foremost, the present invention extends the digging and transplanting season well beyond that of the previously known conventional ball and burlap technique. This is accomplished in part because the balls can be smaller and lighter while still containing (because of branching) a higher proportion of roots than the conventional ball and burlap. Success in transplanting is also due in part to availability of accumulated hydrocarbons which nourish subsequent root growth. Because of the compactness of the root ball, sandy loams unsuitable for the ball and burlap technique can now be used in the present system, while a much higher proportion of the roots are retained in the ball. Consequently, the trees of the present invention can be held easier and longer on retail lots without rewrapping with burlap. And, less time and effort is required in digging and transplanting the tree grown in the fabric bag of the present invention. In fact, trees grown in the root control bags according to the present invention have been successfully transplanted without digging by merely lifting the tree, root ball and bag directly out of the ground. In using the root control bag above grade, many of the advantages of thermal insulation and protection from the wind can be achieved by close packing of the root bags with plants while all of the other inherent advantages of the root control bag are preserved.

Having thus described and exemplified the invention with a certain degree of particularity, it is manifest that many changes can be made in the details of the construction of the fabric bag and the method of employing the bag without departing from the spirit and scope of this invention. Therefore, it is to be understood that the invention is not limited to the specific embodiments set forth herein for purposes of exemplification, but is to be limited only by the scope of the attached claims, including a full range of equivalents to which each element thereof is entitled.

We claim:

1. A method of controlling the root growth of nursery stock intended for transplanting comprising the steps of:

(a) excavating a hole in the earth;

(b) inserting within said hole a nonwoven, porous, needled, fused fabric liner formed of staple synthetic thermoplastic fibers;

(c) filling said liner with growing media; and (d) planting and growing a plant within said liner in the earth such that the liner and the growing plant can later be removed from the earth as a single unit for transporting and transplanting.

2. A method of claim 1 wherein said plant is a container grown nursery stock plant.

3. A method of claim 2 wherein said fabric liner is formed of fibers selected from the group consisting of polyolefin fibers, polyester fibers and polyamide fibers.

4. A method of claim 2 wherein said fabric liner is formed of staple polypropylene fibers and said fabric is at least partially fused by infrared radiation.

5. In a process for growing nursery stock having an increased tolerance to hot weather transplanting, the specific improvement comprising:

(a) excavating a hole in the earth;

(b) inserting within said hole a nonwoven, porous, needled, fused fabric liner formed of staple synthetic thermoplastic fibers;

(c) filling said liner with growing media; and (d) growing a plant within said liner in the earth such that the liner and the growing plant can be transported as a single unit.

6. A process of claim 5 wherein said plant is a container grown nursery stock plant.

7. A process of claim 5 wherein said fabric liner is formed of fibers selected from the group consisting of polyolefin fibers, polyester fibers and polyamide fibers.

8. A process of claim 5 wherein said fabric liner is formed of staple polypropylene fibers and said fabric is at least partially fused by infrared radiation.

9. In a method for the growing of nursery stock plants intended for transplanting wherein the roots of the plants are confined to containers filled with growing media, the specific improvement comprising making said container from a nonwoven, porous, needled, heat fused fabric formed of staple synthetic thermoplastic fibers wherein said fabric is operatively capable of pruning said roots and inducing root branching when said roots penetrate said fabric.

10. A method of claim 9 wherein said fibers forming said fabric are polypropylene fibers.

11. A root pruning nursery stock container with plant comprising a nonwoven, porous, needled fiber bonded fabric bag formed of staple synthetic fibers operatively capable of pruning plant roots and inducing root branching when said roots penetrate said fabric bag, a plant and growing media.

12. A root pruning nursery stock container of claim 11 wherein said fabric bag is formed of staple polypropylene fibers.

13. A method of girdling the root growth of a plant comprising the step of introducing a nonwoven, porous, needled fiber bonded fabric barrier formed of staple synthetic fibers in the path of said root growth that said root growth penetrates said fabric and is girdled as it attempts to develop.

14. A method of claim 13 wherein said fabric is formed of staple polypropylene fibers.

15. A method of controlling the root growth of nursery stock prior to transplanting such nursery stock comprising the steps of:

confining said root growth within a root control barrier formed of a nonwoven, porous, needled, bonded staple polymeric fiber fabric having sufficient porosity and structural strength to allow initial penetration by roots but to constrict such roots whereby root growth outside said barrier is restricted and enlarged root nodule formation and root branching are promoted within said barrier; and removing said root growth from said barrier prior to transplanting said nursery stock.

16. The method of claim 15 wherein said nonwoven, porous, staple polymeric fiber fabric is at least partially bonded by infrared radiation fusion.

17. The method of claim 16 wherein said nonwoven, porous polymeric fabric is formed of staple polypropylene fibers.

* * * * *